(12) United States Patent
Fitzgerald et al.

(10) Patent No.: US 7,690,036 B2
(45) Date of Patent: Mar. 30, 2010

(54) SPECIAL GROUP LOGON TRACKING

(75) Inventors: Eric Fitzgerald, Bellevue, WA (US); Raghavendra Malpani, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1142 days.

(21) Appl. No.: 11/301,304

(22) Filed: Dec. 12, 2005

(65) Prior Publication Data
US 2007/0136798 A1    Jun. 14, 2007

(51) Int. Cl.
G06F 11/30 (2006.01)
G06F 15/173 (2006.01)
(52) U.S. Cl. .............. 726/22; 726/7; 709/225
(58) Field of Classification Search ............ 726/7, 726/22; 709/225
See application file for complete search history.

(56) References Cited

U.S. PATENT DOCUMENTS

| 6,336,117 B1 * | 1/2002 | Massarani ............ 707/100 |
|---|---|---|
| 7,194,004 B1 * | 3/2007 | Thomsen ............ 370/401 |
| 2005/0172149 A1 * | 8/2005 | Xu et al. ............ 713/200 |
| 2005/0204162 A1 * | 9/2005 | Rayes et al. ............ 713/201 |
| 2006/0085370 A1 * | 4/2006 | Groat et al. ............ 707/1 |

* cited by examiner

Primary Examiner—Christian LaForgia
(74) Attorney, Agent, or Firm—Woodcock Washburn LLP

(57) ABSTRACT

A method of generating a computer user activity log for a user belonging to a specially monitored group includes allowing a user to logon to a local computer. The local computer verifying the user account credentials and creating a user logon session. A token is created by the local computer for identification of any group membership with which the user associated and also having the user access privileges. The group information in the token is compared with a specially monitored group list. The specially monitored group list may be obtained from a domain server or may be configured locally. If the user has membership in the specially monitored group, then a special logon session is created and activities of the user are recorded.

20 Claims, 2 Drawing Sheets

SPECIAL GROUP LOGON TRACKING

BACKGROUND

Today, modern operating systems require mechanisms for managing the identities and relationships of the distributed resources that make up network environments. A directory service provides a place to store information about network-based entities, such as applications, files, printers, and people. It provides a consistent way to name, describe, locate, access, manage, and secure information about these individual resources. A directory service acts as the main switchboard of the network operating system. It is the central authority that manages the identities and brokers the relationships between these distributed resources, enabling them to work together. Because a directory service supplies these fundamental network operating system functions, it must be tightly coupled with the management and security mechanisms of the operating system to ensure the integrity and privacy of the network. It also plays a critical role in an organization's ability to define and maintain the network infrastructure, perform system administration, and control the overall user experience of a company's information systems.

Today, directory services enable tracking the computer session activities of specific users. Commonly, "auditing" capabilities in directory services can provide user session recording and tracking. Some of those users may be users of special interest or "sensitive users". Sensitive users can be defined in many ways. Examples of sensitive users can be users new to an organization and/or users that have special system resource permissions, such as administrative users with broad capabilities and resource accesses.

Windows security administrators commonly want to track the activities of sensitive user accounts. These accounts are often logically organized into Windows software "groups". The Windows software auditing feature does not have a facility for tracking user accounts by group membership; it only tracks user accounts individually. In an environment with a large number of user accounts, such as is found in most large networks, it is difficult to locate only the events involving these sensitive accounts. This is true because an auditor policy can generate an extremely large amount of audit events, such as user session activities, and sifting through the audit records can be difficult and time consuming. Thus, a technique to identify audit records of some sensitive users is desirable.

One existing technique to track the activities of a specific group of users is to enumerate group membership of sensitive groups at some point in time, and identify events for the accounts which were members of the group at the time of enumeration. This method has an inherent flaw; group membership changes over time. One possible threat to network security is a rogue user that has broad levels of access to computer resources and attacks one or more of the resources but remains anonymous. For example, a clever attacker can modify group membership, log onto a network, perform mischief, and modify membership back before the next enumeration and thus avoid detection. One method of detection in this instance could be modification of the existing group detection method to search for events indicating group membership changes. Those changes could be taken into account in searching for malicious activity. But, this modification would be extremely complex and fragile in a distributed environment. In addition, clairvoyant knowledge of the malicious user in geographic and temporal terms may be necessary for a successful query of the log of all user activity to determine the identify of the malicious user. Therefore, a more secure option is desirable.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A means to create audit records for specific groups of users also provides a reliable way to locate members of these groups in the audit trail and provides positive correlation with other related audit records in the audit trail. The method includes generating a special audit record for computer users that belong to specific groups identified by a system administrator. When a user with a valid account logs onto a computer, a local token is generated that contains data concerning the user privileges and membership of the user in any group. The token is compared against a list of groups to be specially monitored. If the user is a member of one of the specially monitored group, a special audit record is initialized having a locally unique identifier useful for tracking the user activities. The locally unique identifier is subsequently useful in locating other audit records of the activities of the user.

DETAILED DESCRIPTION OF ILLUSTRATIVE EMBODIMENTS

Exemplary Embodiments

Figure 1:
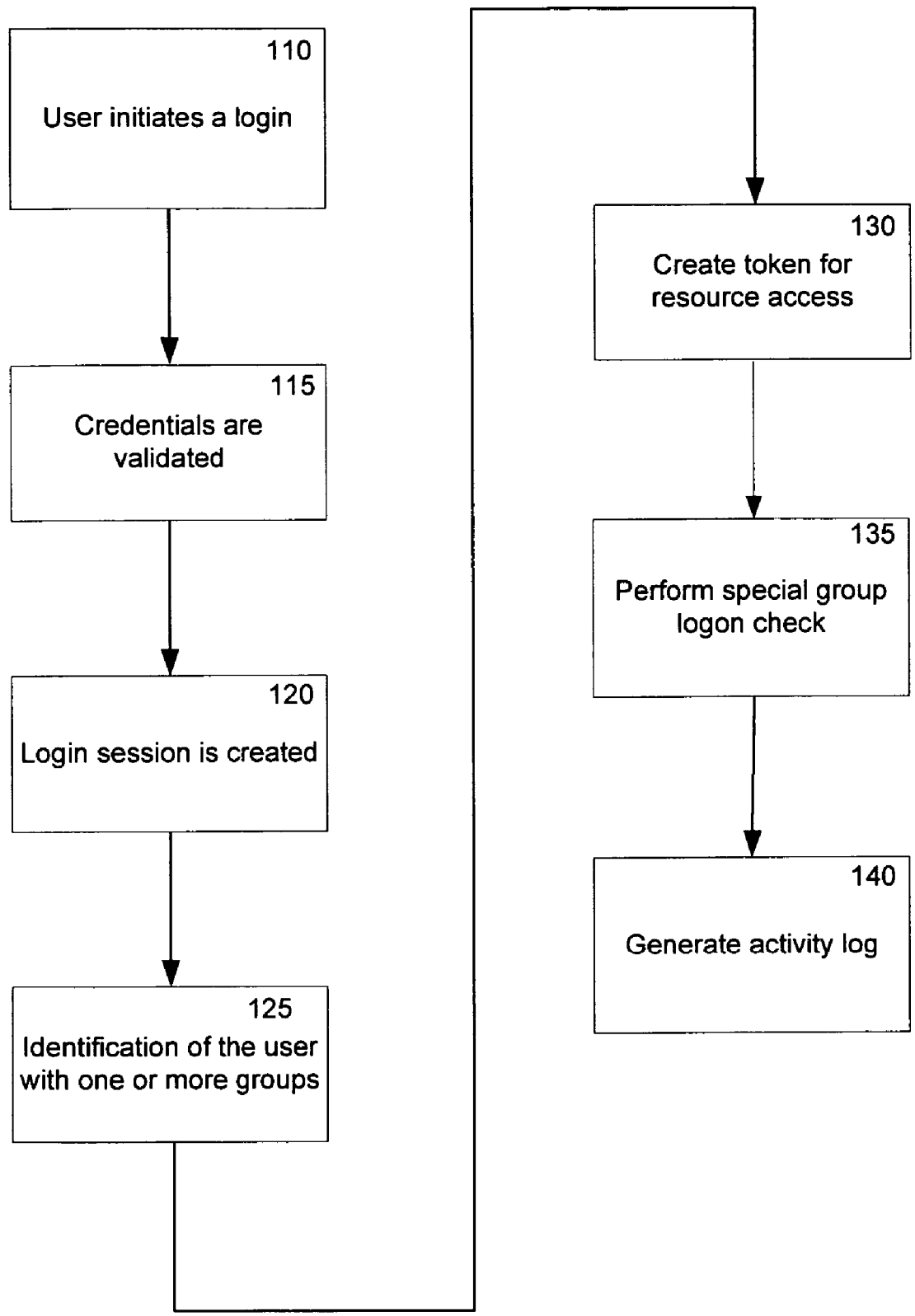
FIG. 1 is an example flow diagram of a method according to aspects of the invention.

FIG. 1 depicts a method 100 having aspects of the invention. The method may start by a user initiating a login (step 110) on a computing device. A login by a user would normally include entry of an identifying account or user name. In one embodiment, the user would login to a computing device having a Windows® 2000 or later operating system which also includes Active Directory® type of directory service support. A credential validation for the user would then occur (step 115). In one embodiment, a user may enter a password, a biometric identifier, or some other credential used for verification of the user or account use. The computing device verifies the credential and allows the user access to the account.

The computing device then begins generation of a login session (step 120). The login session may include the generation of a data structure to record activities occurring with the newly accessed account. Identification of the user with one or more groups is then performed (step 125). In one embodiment, this step may be performed using the Windows Local Security Authority software function. The Local Security Authority maintains information about all aspects of local security on a system. In this instance, the Local Security Authority assembles a list of groups to which the logged-on account belongs. This information may be stored locally or may be acquired remotely. For example, in one embodiment, the Local Security Authority may acquire this information from a domain controller or server that services the local machine.

The groups to which the account belongs may be generally be input by a system administrator or auditor function. The list of groups may include sensitive groups or groups of particular interest for monitoring. These groups may be created, deleted, or modified by a system administrator and stored in the audit policy stores. In one embodiment, the Active Directory® software package maintains a registry, file or database that contains the listing of groups and their individual membership. This membership can change over time as members are added or deleted to/from various groups.

After the user is identified as being a member of one or more groups, the local computing device creates a token (step 130). The token may take several forms. In one embodiment, the token is a cache that contains information for access control to the resources available to the user as a result of his logon privileges. The token is assigned to the logon session for the user account. Thus the token is unique to the logon session. In one embodiment, the token and logon session is uniquely identified by a locally unique identifier. A locally unique identifier is a 64-bit value that is guaranteed to be unique on the operating system that generated it until the system is restarted. In one embodiment, the data structure of the token generated by the local computing machine may store the list of groups in which the logged-in account user has membership.

A special group logon check is performed (step 135) to check the logged-on user group membership against the list of sensitive or special groups in the audit policy. In one embodiment, the local computer may access a list provided by a domain server to assess if the user is a member of a specially monitored group. If one of the groups which the user is a member matches the audit policy sensitive group intended for monitoring, then a new audit record is created. The new audit record identifies such items as the user identification, the specially monitored group, the locally unique identifier, the login session, and the users activities. Following the initiation of a new audit record, activities of the logged-in user are recorded (step 140).

The new audit record can be accessed at a later time by a system administrator or auditor and may be easily searched. In one embodiment, if a malicious user is identified using the special group identification, other records may be searched more easily now that the identity of the malicious user is known. Other events in the user account may then be examined to further inform the system administrator or auditor of activities by the identified user.

Exemplary Computing Device

Figure 2:
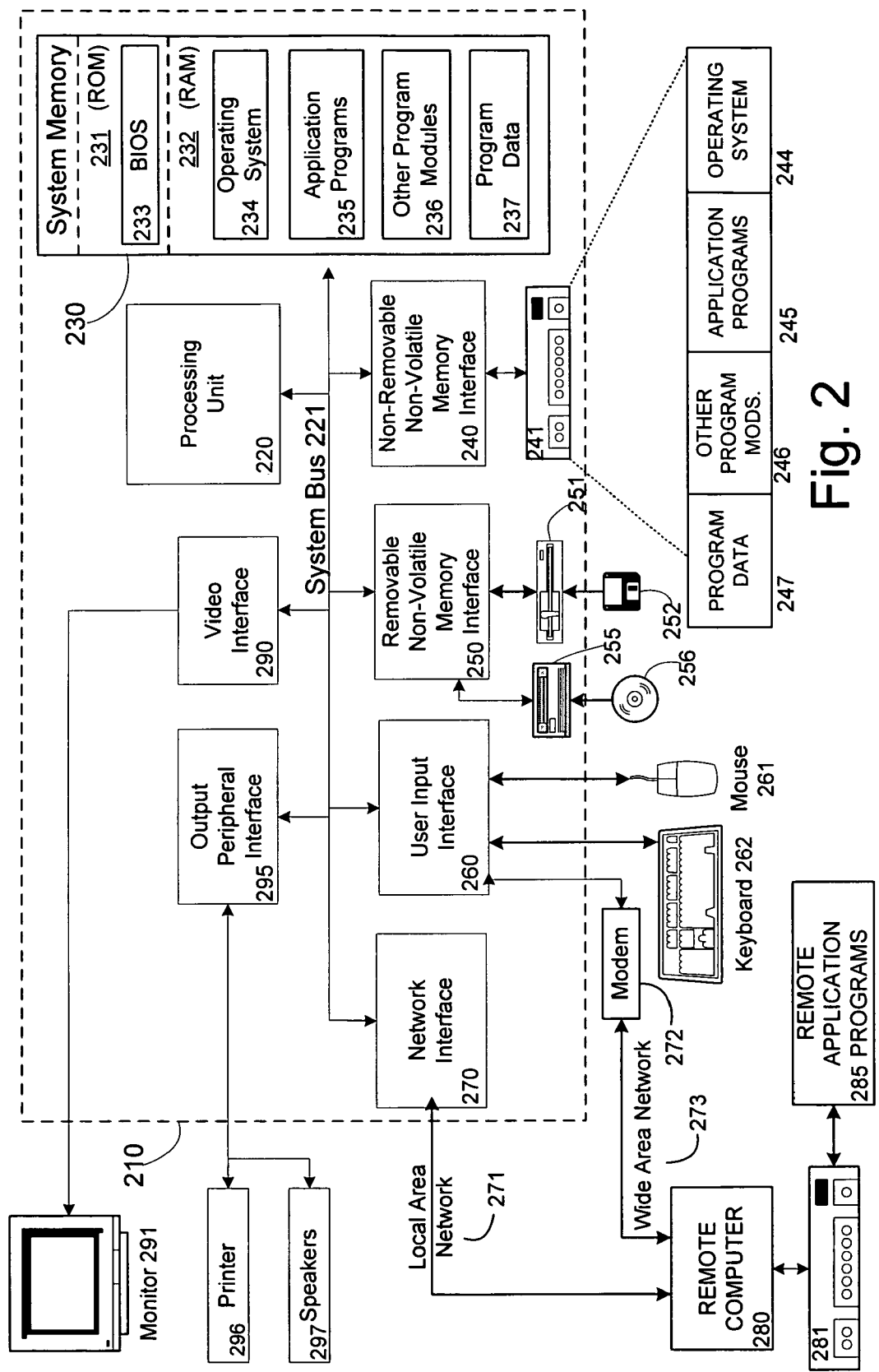
FIG. 2 is a block diagram showing an example computing environment in which aspects of the invention may be implemented.

FIG. 2 and the following discussion are intended to provide a brief general description of a suitable computing environment in which embodiments of the invention may be implemented. While a general purpose computer is described below, this is but one single processor example, and embodiments of the invention with multiple processors may be implemented with other computing devices, such as a client having network/bus interoperability and interaction. Thus, embodiments of the invention may be implemented in an environment of networked hosted services in which very little or minimal client resources are implicated, e.g., a networked environment in which the client device serves merely as an interface to the network/bus, such as an object placed in an appliance, or other computing devices and objects as well. In essence, anywhere that data may be stored or from which data may be retrieved is a desirable, or suitable, environment for operation.

Although not required, embodiments of the invention can also be implemented via an operating system, for use by a developer of services for a device or object, and/or included within application software. Software may be described in the general context of computer-executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that various embodiments of the invention may be practiced with other computer configurations. Other well known computing systems, environments, and/or configurations that may be suitable for use include, but are not limited to, personal computers (PCs), automated teller machines, server computers, hand-held or laptop devices, multi-processor systems, microprocessor-based systems, programmable consumer electronics, network PCs, appliances, lights, environmental control elements, minicomputers, mainframe computers and the like. Embodiments of the invention may also be practiced in distributed computing environments where tasks are performed by remote processing devices that are linked through a communications network/bus or other data transmission medium. In a distributed computing environment, program modules may be located in both local and remote computer storage media including memory storage devices and client nodes may in turn behave as server nodes.

With reference to FIG. 2, an exemplary system for implementing an embodiment of the invention includes a general purpose computing device in the form of a computer system 210. Components of computer system 210 may include, but are not limited to, a processing unit 220, a system memory 230, and a system bus 221 that couples various system components including the system memory to the processing unit 220. The system bus 221 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer system 210 typically includes a variety of computer readable media. Computer readable media can be any available media that can be accessed by computer system 210 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, Random Access Memory (RAM), Read Only Memory (ROM), Electrically Erasable Programmable Read Only Memory (EEPROM), flash memory or other memory technology, Compact Disk Read Only Memory (CDROM), compact disc-rewritable (CDRW), digital versatile disks (DVD) or other optical disk storage, magnetic cassettes, magnetic tape, magnetic disk storage or other magnetic storage devices, or any other medium which can be used to store the desired information and which can accessed by computer system 210. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 230 includes computer storage media in the form of volatile and/or nonvolatile memory such as read only memory (ROM) 231 and random access memory (RAM) 232. A basic input/output system 233 (BIOS), containing the basic routines that help to transfer information between elements within computer system 210, such as during start-up, is typically stored in ROM 231. RAM 232 typically contains data and/or program modules that are immediately accessible to and/or presently being operated on by processing unit 220. By way of example, and not limitation, FIG. 2 illustrates operating system 234, application programs 235, other program modules 236, and program data 237.

The computer system 210 may also include other removable/non-removable, volatile/nonvolatile computer storage media. By way of example only, FIG. 2 illustrates a hard disk drive 241 that reads from or writes to non-removable, nonvolatile magnetic media, a magnetic disk drive 251 that reads from or writes to a removable, nonvolatile magnetic disk 252, and an optical disk drive 255 that reads from or writes to a removable, nonvolatile optical disk 256, such as a CD ROM, CDRW, DVD, or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 241 is typically connected to the system bus 221 through a non-removable memory interface such as interface 240, and magnetic disk drive 251 and optical disk drive 255 are typically connected to the system bus 221 by a removable memory interface, such as interface 250.

The drives and their associated computer storage media discussed above and illustrated in FIG. 2 provide storage of computer readable instructions, data structures, program modules and other data for the computer system 210. In FIG. 2, for example, hard disk drive 241 is illustrated as storing operating system 244, application programs 245, other program modules 246, and program data 247. Note that these components can either be the same as or different from operating system 234, application programs 235, other program modules 236, and program data 237. Operating system 244, application programs 245, other program modules 246, and program data 247 are given different numbers here to illustrate that, at a minimum, they are different copies. A user may enter commands and information into the computer system 210 through input devices such as a keyboard 262 and pointing device 261, commonly referred to as a mouse, trackball or touch pad. Other input devices (not shown) may include a microphone, joystick, game pad, satellite dish, scanner, or the like. These and other input devices are often connected to the processing unit 220 through a user input interface 260 that is coupled to the system bus 221, but may be connected by other interface and bus structures, such as a parallel port, game port or a universal serial bus (USB). A monitor 291 or other type of display device is also connected to the system bus 221 via an interface, such as a video interface 290, which may in turn communicate with video memory (not shown). In addition to monitor 291, computer systems may also include other peripheral output devices such as speakers 297 and printer 296, which may be connected through an output peripheral interface 295.

The computer system 210 may operate in a networked or distributed environment using logical connections to one or more remote computers, such as a remote computer 280. The remote computer 280 may be a personal computer, a server, a router, a network PC, a peer device or other common network node, and typically includes many or all of the elements described above relative to the computer system 210, although only a memory storage device 281 has been illustrated in FIG. 2. The logical connections depicted in FIG. 2 include a local area network (LAN) 271 and a wide area network (WAN) 273, but may also include other networks/buses. Such networking environments are commonplace in homes, offices, enterprise-wide computer networks, intranets and the Internet.

When used in a LAN networking environment, the computer system 210 is connected to the LAN 271 through a network interface or adapter 270. When used in a WAN networking environment, the computer system 210 typically includes a modem 272 or other means for establishing communications over the WAN 273, such as the Internet. The modem 272, which may be internal or external, may be connected to the system bus 221 via the user input interface 260, or other appropriate mechanism. In a networked environment, program modules depicted relative to the computer system 210, or portions thereof, may be stored in the remote memory storage device. By way of example, and not limitation, FIG. 2 illustrates remote application programs 285 as residing on memory device 281. It will be appreciated that the network connections shown are exemplary and other means of establishing a communications link between the computers may be used.

Various distributed computing frameworks have been and are being developed in light of the convergence of personal computing and the Internet. Individuals and business users alike are provided with a seamlessly interoperable and Web-enabled interface for applications and computing devices, making computing activities increasingly Web browser or network-oriented.

For example, MICROSOFT®'s .NET™ platform, available from Microsoft Corporation, includes servers, building-block services, such as Web-based data storage, and downloadable device software. While exemplary embodiments herein are described in connection with software residing on a computing device, one or more portions of an embodiment of the invention may also be implemented via an operating system, application programming interface (API) or a "middle man" object between any of a coprocessor, a display device and a requesting object, such that operation may be performed by, supported in or accessed via all of .NET™'s languages and services, and in other distributed computing frameworks as well.

As mentioned above, while exemplary embodiments of the invention have been described in connection with various computing devices and network architectures, the underlying concepts may be applied to any computing device or system in which it is desirable to implement a group selectable mechanism for generating audit records. Thus, the methods and systems described in connection with embodiments of the present invention may be applied to a variety of applications and devices. While exemplary programming languages, names and examples are chosen herein as representative of various choices, these languages, names and examples are not intended to be limiting. One of ordinary skill in the art will appreciate that there are numerous ways of providing object code that achieves the same, similar or equivalent systems and methods achieved by embodiments of the invention.

The various techniques described herein may be implemented in connection with hardware or software or, where appropriate, with a combination of both. Thus, the methods and apparatus of the invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention.

While aspects of the present invention has been described in connection with the preferred embodiments of the various figures, it is to be understood that other similar embodiments may be used or modifications and additions may be made to the described embodiment for performing the same function of the present invention without deviating therefrom. Furthermore, it should be emphasized that a variety of computer platforms, including handheld device operating systems and other application specific operating systems are contemplated, especially as the number of wireless networked devices continues to proliferate. Therefore, the claimed invention should not be limited to any single embodiment, but rather should be construed in breadth and scope in accordance with the appended claims.

What is claimed:

1. A computer-implemented method of generating a computer user activity log, the method comprising:
   receiving a user login, verifying user account credentials, and creating a login session;
   identifying for the user one or more groups to which the user was previously assigned;
   in response to identifying for the user one or more groups to which the user was previously assigned, creating a token, the token comprising data representing the one or more groups to which the user was previously assigned;
   determining if the one or more groups to which the user was previously assigned includes a group to be monitored; and
   creating an audit record for the login session if the one or more groups to which the user was previously assigned is a group to be monitored.

2. The method of claim 1, wherein identifying the user as a member of at least one group comprises correlating the user with a list of groups stored in an audit policy.

3. The method of claim 2, wherein the audit policy is stored locally on the computer.

4. The method of claim 1, wherein creating a token further comprises creating a data structure that lists computer resource access privileges of the user.

5. The method of claim 4, wherein the token further comprises a locally unique identifier for the login session.

6. The method of claim 1, wherein determining if the one or more groups to which the user was previously assigned includes a group to be monitored comprises checking token group data against a list of groups to be specially monitored.

7. The method of claim 6, wherein the list of groups to be specially monitored is derived from an audit policy, wherein the audit policy is editable by a system administrator.

8. The method of claim 1, wherein determining if the one or more groups to which the user was previously assigned includes a group to be monitored comprises:
   accessing a domain server having an audit policy comprising a list of groups to be specially monitored; and
   comparing the one or more groups to which the user was previously assigned against the list of groups associated with an audit policy, wherein the list and audit policy are editable by a system administrator.

9. The method of claim 1, wherein creating an audit record for the login session if the user is a member of a group to be monitored comprises creating an audit record comprising user identification data, the group to be monitored, a locally unique identifier for the login session and login session activities.

10. A computer system to monitor computer activities of a user having membership to a specially monitored group, the system comprising:
    a CPU responsive to a request by a user to create a login session;
    a local data storage device, the local storage device having a first list of users, the first list of users comprising associations for each user at least one group to which the user was previously assigned;
    an interface to a domain server, the domain server having a second list, the second list comprising a list of groups to be specially monitored;
    wherein the CPU executes a login software program that uses the first list to determine for each user the at least one group to which the user was previously assigned, communicates with the domain server to determine if the at least one group to which the user was previously assigned is identified for monitoring using the second list, and creates an audit record of the login session of the user if the at least one group to which the user was previously assigned is identified as a specially monitored group.

11. The system of claim 10, further comprising a token created upon login of a user, the token comprising data associated with the at least one group to which the user was previously assigned and data associated with access control of computer resources corresponding to user privileges.

12. The system of claim 10, wherein the interface to the domain server is used to initially load the local storage device with the first list.

13. The system of claim 10, wherein the first list comprises one of a registry, a file, or a database.

14. The system of claim 10, wherein the audit record of the user session comprises user identification data, the group to be monitored, a locally unique identifier for the login session and login session activities.

15. The system of claim 14, wherein the locally unique identifier allows later correlation with other records associated with the user.

16. A computer-readable storage medium having computer-executable instructions for performing a method of generating a computer user activity log, the method comprising:
    receiving a user login, verifying user account credentials, and creating a login session;
    identifying for the user one or more groups to which the user was previously assigned;
    in response to identifying for the user one or more groups to which the user was previously assigned, creating a token, the token comprising data representing group membership identifying the one or more groups to which the user was previously assigned;

determining if the group membership includes a group to be monitored; and creating an audit record for the login session if the user is a member of a group to be monitored, wherein the audit record comprises: a locally unique identifier useful to correlate other records with activities of the user; a user identifier; the group to be monitored; a login session; and activities of the user.

17. The computer-readable storage medium of claim 16, wherein the step of identifying for the user one or more groups to which the user was previously assigned comprises correlating the user with a list of groups stored in an audit policy.

18. The computer-readable storage medium of claim 16, wherein the step of creating a token further comprises a data structure that lists computer resource access privileges of the user.

19. The computer-readable storage medium of claim 16, wherein the step of determining if the group membership data includes a group to be monitored comprises checking the token group against a specially monitored group identified using an audit policy, wherein the audit policy is editable by a system administrator.

20. The computer-readable storage medium of claim 16, wherein the step of determining if the group membership data includes a group to be monitored comprises accessing a domain server having an audit policy comprising a list of groups to be specially monitored; and comparing the token group membership data against the list of groups associated with an audit policy, wherein the list and audit policy are editable by a system administrator.

\* \* \* \* \*